United States Patent [19]
Millot et al.

[11] Patent Number: 4,544,521
[45] Date of Patent: Oct. 1, 1985

[54] ACTUATING DEVICE FOR TWO CLUSTERS OF CONTROL RODS MOVABLE VERTICALLY IN ONE AND THE SAME FUEL ARRAY OF THE CORE OF A NUCLEAR REACTOR

[75] Inventors: Jean-Paul Millot, Elancourt; Guy Desfontaines, Puteaux; Michel Babin, Pantin, all of France

[73] Assignee: Framatome & Cie., Courbevoie, France

[21] Appl. No.: 556,867

[22] Filed: Dec. 1, 1983

[30] Foreign Application Priority Data

Dec. 8, 1982 [FR] France ................................. 82 20543

[51] Int. Cl.$^4$ ................................................ G21C 7/02
[52] U.S. Cl. ...................................... 376/209; 376/228;
 376/233; 376/235; 376/237; 403/31; 403/322;
 403/87.1; 294/86.17; 294/86.24; 294/87.1;
 294/88; 294/93
[58] Field of Search ................ 376/209, 228, 233, 235,
 376/237, 224, 264, 268, 271; 403/31, 322, 326,
 330, 321; 294/86.17, 86.24, 87 R, 88, 93, 86 A,
 86.25

[56] References Cited

U.S. PATENT DOCUMENTS 4,382,711  5/1983  Lafosse ................................. 403/290
4,423,002 12/1983  Wiart ................................... 376/233
4,439,054  3/1984  Veronesi .............................. 403/323

FOREIGN PATENT DOCUMENTS 2106373  5/1972  France .

Primary Examiner—Donald P. Walsh
Attorney, Agent, or Firm—Pollock, Vande Sande & Priddy

[57] ABSTRACT

The invention relates to an actuating device for two clusters of control rods movable vertically in one and the same fuel array of the core of a nuclear reactor.

The first cluster, used for running the reactor, is connected to a first actuating rod (2), the movements of which are effected by a mechanism (27, 28, 29, 30, 34). This rod (2) carries hooking fingers (41), the operation of which is effected by a device (45) mounted slidingly on the end of the rod (2). The device (45) causes the closing of the fingers by means of a spring (46), or on the contrary their opening by overstroke movement towards the top of the rod (2). The second cluster remaining fully inserted into the assembly during a part of the operating cycle of the reactor is connected to a second actuating rod (3). This second rod (3), fitted coaxially within the rod (2), forms a piston (3b) in this rod (2) driven for its upward movement by the opening of a pressure relief valve (65) of the fluid-tight enclosure (1) in which the actuating rods (2 and 3) move. The rod (3) in the top position can be connected to the rod (2) by the fingers (41) engaging in a groove (53) of the rod (3).

The invention is applicable particularly to nuclear reactors with improved efficiency employing neutron spectrum variation clusters.

4 Claims, 5 Drawing Figures

FIG.2.b.

ACTUATING DEVICE FOR TWO CLUSTERS OF CONTROL RODS MOVABLE VERTICALLY IN ONE AND THE SAME FUEL ARRAY OF THE CORE OF A NUCLEAR REACTOR

The invention relates to an actuating device for two clusters of control rods movable vertically in one and the same fuel array of the core of a nuclear reactor.

PRIOR ART

In order to improve the performance of pressurized water nuclear reactors as regards to utilization of the fuel, methods of operating these reactors have been proposed which involve a variation in the neutron energy spectrum in the core of the reactor during the operating cycle of the latter. For example, the method described in French patent application No. 82-18011 of 27th Oct. 1982 filed by the FRAMATOME company provides, during the first part of the operating cycle of the reactor, for the introduction into the core of clusters of rods of neutron-absorbing material. In this way a hardening of the neutron spectrum is produced both by reducing the volume of moderator in the core and by absorption of the low-energy neutrons. In a second part of the operating cycle of the reactor, the clusters of absorbing rods are extracted from the core of the reactor and the fissile material formed during the first phase is consumed. The rods preferably consist of a fertile material capable of being transformed into fissile material by the effect of neutron bombardment.

French patent application No. 82-18012 of 27th Oct. 1982 describes a nuclear reactor with improved efficiency using particularly an assembly of clusters of rods of fertile material to vary the neutron spectrum during the operating cycle of the reactor.

In such a reactor, control rods consisting of clusters of neutron-absorbing rods which are inserted more or less into the arrays forming the core of the reactor in order to run the latter are used conjointly with clusters of fertile rods which are fully inserted into the fuel arrays forming the core of the reactor during the first part of its operating cycle. Particularly, the clusters of absorbing rods effecting the running of the nuclear reactor and the clusters of fertile rods may be associated with the same arrays of the reactor core.

In fact, the core of the reactor consists of an assembly of fuel arrays formed by bundles of long fuel rods arranged vertically and side by side within the vessel of the reactor, which is filled with pressurized water.

Some fuel rods of the bundle are replaced by guide tubes within which an assembly of control rods forming the control bars, or an assembly of fertile rods, can be moved vertically. One array in two in the core is given a cluster of absorbing control rods and a cluster of fertile rods simultaneously. The other arrays of the core are given neither absorbing rods nor fertile rods, but clusters of plugs which prevent the core from being by-passed by the guide tubes. The absorbing rods enter a first assembly of guide tubes of the array, whereas the fertile rods enter a second assembly of guide tubes of this array.

The clusters of absorbing rods used for running the reactor are connected to a long actuating rod which prolongs them upwards and which moves within a fluid-tight enclosures communicating with the internal volume of the reactor vessel. A mechanism for the maintenance and for the controlled vertical movement of the actuating rod and of the cluster of absorbing rods attached to its lower part is arranged in this fluid-tight enclosure. This controlled vertical movement mechanism of the cluster generally consists of an assembly of movement pawls and of maintenance pawls actuated by electromagnetic coils. The actuating rod is machined on its external surface to produce flutes into which the teeth of the pawls can engage for the maintenance or the movement of the actuating rod.

The actuating rod of the absorbing assembly comprises at its lower part a detachable connecting device between the rod and the cluster, the separation of the latter being effected for example when the reactor vessel is opened after being depressurized for the operations of recharging the reactor core.

In the case where two clusters are associated with one and the same array, the second cluster is likewise prolonged upwards by a detachable actuating rod of this cluster.

The clusters of control rods consist of parallel rods arranged in a network identical to the network of the guide tubes reserved for their movement and connected at their upper part to a fixing piece comprising an assembly knob to the actuating rod.

In the case of an array equipped with two types of clusters, the two knobs may be placed coaxially, the fixing piece of the fertile rods being arranged beneath the fixing piece of the absorbing rods. It is thus possible to move the absorbing rods independently of the fertile rods when the latter are fully inserted during the first part of the operating cycle of the reactor.

The detachable connecting device between an actuating rod and the fixing piece of the cluster may consist, as is customary of a laterally expansible bushing comprising two projections engaging into grooves within the knob of the cluster, the expansion of the bushing being obtained by a handling rod arranged centrally and axially in the actuating rod, the end of which, equipped with an oval knob, permits the separation of the expansible bushing.

On the other hand, a control device for a nuclear reactor is known, being described in French Pat. No. 2,106,373 and comprising, for one and the same array, two coaxial clusters, one of these clusters being a control cluster controllably movable in the core of the reactor and the other a shut-off cluster which can be lowered into the position of maximum insertion in the core in order to shut down the reactor.

Apart from the fact that this device is not transferable to the case of an improved nuclear reactor as above described, since the function of the shut-off rod is different from that of the cluster of fertile rods, the device described is complicated and necessitates the presence of an additional electromagnetic coil to maintain the shut-off rod in the top position.

The shut-off rod is arranged above the actuating rod since it is always in the top position during the operation of the reactor, whereas the rod of fertile rods of the above-described reactor with improved efficiency is in the bottom position where it is fully inserted into the fuel array during the first part of the operating cycle of the reactor.

Thus no positional actuating device in the vertical direction of two clusters of control rods associated with one and the same array which permits one cluster to be moved independently of the other which is in the fully inserted position in the array and which is of simple construction not employing motor driving means beyond those necessary for the controlled movement of the first cluster of the control rods, was known.

SUMMARY OF THE INVENTION

It is therefore the aim of the invention to propose an actuating device for two clusters of control rods movable vertically in one and the same fuel array in the core of a nuclear reactor comprising a vessel containing a pressurized fluid in which is immersed the reactor core consisting of arrays formed by vertically arranged bundles of fuel rods into which the clusters are inserted during the operation of the reactor, one of the clusters comprising neutron-absorbing rods effecting the running of the reactor by vertical movements modifying the insertion of the absorbing rods, and the second cluster remaining fully inserted into the array during only a part of the operating cycle of the reactor, independently of the movement of the first cluster, each cluster consisting of an assembly of rods arranged mutually parallel and attached to a fixing piece, the mechanism comprising two long vertical actuating rods, the one associated with the first and the other with the second of the two clusters, movable within a fluid-tight enclosure communicating with the internal volume of the vessel, a maintenance and controlled vertical movement mechanism in the fluid-tight enclosure of the actuating rod of the first cluster, and a detachable connecting device between each of the two clusters and the corresponding actuating rod, this device being required to permit the controlled movement of the first cluster, the second being fully inserted into the array, and the positional control of the two clusters without any additional motor drive device beyond those existing for the first cluster of absorbing rods.

To this end, the actuating rod of the first cluster, or first actuating rod, consists of a cylindrical sleeve carrying in its upper part hooking fingers movable transversely to project into the internal space of the actuating rod or into the retracted position and an actuating device for the fingers fitted slidingly in the axial direction on the top end of the actuating rod between a closed position of the fingers where the actuating device is maintained in the top position relative to the actuating rod by a spring and an open position of the fingers where it is moved into the bottom position by virtue of a bearing surface coming into abutment in a part of the internal surface of the fluid-tight enclosure at the end of the upward movement of the first actuating rod, the actuating rod of the second cluster, or second actuating rod, arranged coaxially and within the first actuating rod throughout its length comprises a widened part fitted with at least two sealing segments limiting the passage of the pressurized fluid in the annular space made between the two actuating rods and effecting the guidance of the second actuating rod consisting of a piston in the first actuating rod, a hooking groove for the fingers carried by the first actuating rod and a projecting part serving as an abutment to stop the second actuating rod in the hooked position of the fingers at the end of the upward movement of the second rod in the first, lastly, the fluid-tight enclosure comprises at its upper part a pressure relief valve for its internal volume.

BRIEF DESCRIPTION OF THE DRAWINGS

There will now be described by way of example not implying a limitation, and with reference to the accompanying drawings, an embodiment of an actuating device according to the invention, in the case of a cluster of control rods and a cluster of fertile spectrum variation rods movable in one and the same fuel array of a nuclear reactor with improved efficiency.

FIG. 2b is a view on a larger scale of part of FIG. 2 showing particularly the upper end of the second actuating rod.

DETAILED DESCRIPTION

Figure 1A:
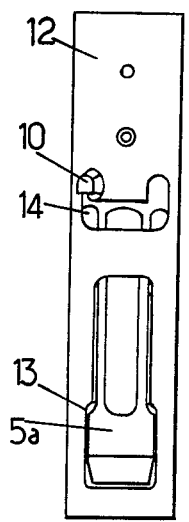
FIG. 1a is a view along F in FIG. 1.
Figure 1:
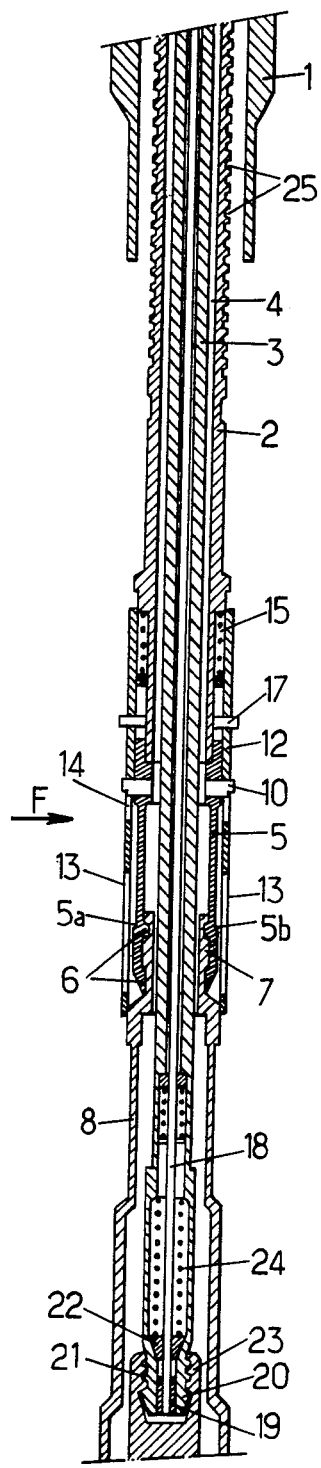
FIG. 1 is a view in section through a vertical plane of the lower part of the actuating device.

FIG. 1 shows a part of the fluid-tight enclosure 1, the lower end of which, not shown, is attached to the vessel cover to place the internal volume of this fluid-tight enclosure in communication with the internal volume of the vessel filled with pressurized water.

The actuating rods 2 and 3 of the control cluster and of the spectrum variation cluster respectively are arranged concentrically along the axis of this fluid-tight enclosure 1.

The external diameter of the inner actuating rod 3 is such that an annular space 4 exists between the two actuating rods.

A coupling bushing 5 comprising two flexible blades 5a and 5b in its lower parts is attached to the lower part of the actuating rod 2. The flexible blades 5a and 5b comprise on their inner surface projecting parts 6 permitting their engagement into corresponding grooves of the knob 7 of the control cluster. This knob 7 is connected by a cylindrical sleeve 8 to a crosshead, not shown, to which the control rods are attached, in an arrangement permitting their introduction into a first assembly of guide tubes of the array arranged vertically and beneath the mechanism illustrated in FIG. 1.

Two studs 10 projecting towards the outside of the bushing 5 are attached to the latter, and a locking sleeve 12 visible in FIGS. 1 and 1a is fitted on them.

The locking sleeve 12, symmetrical relative to the axial plane perpendicular to the plane of the figure, like the bushing 5, comprises two identical ports 13 permitting the disengagement of the flexible blades 5a and 5b laterally, and two U-shaped ports 14 for the passage of the studs 10. The locking sleeve 12 is fitted as a sliding fit on the bushing 5 and is maintained in the bottom position by a spring 15 interposed between the lower part of the rod 2 and the sleeve 12. Actuating studs 17 projecting slightly towards the outside of the locking sleeve 12 are likewise attached to the latter.

A handling rod 18 is fitted inside the rod 3, along its entire length, and carries at its lower part an oval knob 19 engaged in an internal bore of the lower part of the actuating rod 3 forming a bushing 20. The bushing 20 consists of a plurality of flexible blades permitting its radial expansion. Each of the flexible blades has on its external surface projections 21 corresponding to grooves machined inside the knob 23 of the spectrum variation cluster. The knob 23 is connected to a crosshead carrying the fertile rods, not shown. The fixing piece of the fertile rods is arranged beneath the fixing piece of the absorbing control rods, which is connected to the actuating rod 2.

The handling rod 18 comprises at its upper part a connecting piece 68 which is pushed downwards by the spring 69 into abutment with a part of the internal surface of the rod 3. The oval knob 19 is of sufficient diameter to permit the expansion of the bushing 20 and the hooking of the cluster of fertile rods through the intermediary of its knob 23 when the handling rod is in the bottom position illustrated in FIG. 1. The separation of the blades of the bushing is likewise effected redundantly by the roller 22 which is repelled by the spring 24.

Figure 2:
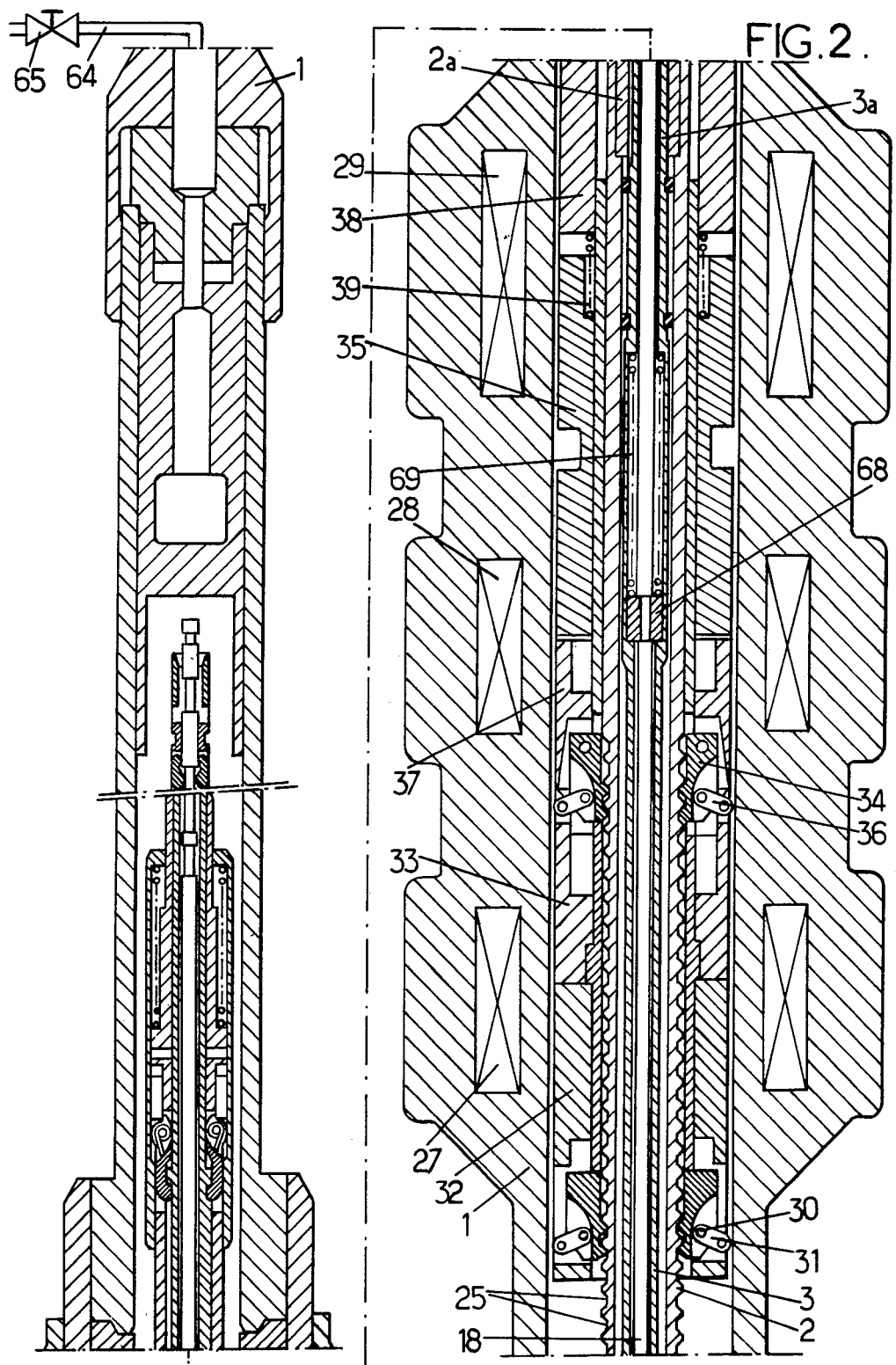
FIG. 2 is a view in section through a vertical plane of the upper part of the device.

FIG. 2 shows the upper part of the rods 2 and 3 within the fluid-tight enclosure 1 and along its axis.

The actuating rod 2 is machined on its outer surface into flutes 25 spaced regularly over a length of the actuating rod corresponding to the length of the cluster, that is to say likewise to the height of the array.

Three electromagnetic coils 27, 28 and 29 are arranged round the fluid-tight enclosure. The coil 27, called the maintaining coil, permits the actuation of a set of maintaining pawls 30 through the intermediary of links 31 articulated on the pawls at one of their ends and on a movable magnetic piece 32 at their other end. The energization of the coil 27 permits the movable pole 32 to be attracted and maintained in its top position against a fixed magnetic piece or fixed maintaining pole 33. The double-toothed pawl 30 is shown in FIG. 2 in its closed position, where it maintains the actuating rod 2 in the fixed vertical position.

The coil 28 permits the closure of the pawls 34, called transfer pawls, fitted pivotably on a magnetic piece 35, the closure of the pawls 34 being obtained by virtue of links 36 and of a magnetic piece 37 fitted on the piece 35 and movable with respect thereto.

The coil 29 permits the piece 35 to be moved between a top position in which it is stuck by magnetic attraction to a fixed piece 38, and a bottom position to which it is returned by a spring 39. Generally speaking the movable magnetic pieces are returned into the bottom position by springs.

The whole of the movement mechanism of the rod 2 comprising the three coils 27, 28, 29 and the whole of the movable and fixed magnetic pieces is well known and is currently in use on pressurized water nuclear reactors in service.

The transfer pawl 34, the amplitude of movement of which is equal to the distance between two flutes, permits the actuating rod 2 and the pilot cluster which is connected to it to be moved upwards or downwards in a vertical movement, the amplitude of which is equal to the pitch, that is to say to the distance between two flutes of the actuating rod 2. After each pitch or step, the maintaining pawl 30 resumes charge of the rod, which permits the transfer pawl 34 to be returned into its initial position after having opened it by means of the coil 28. The movements of the actuating rod 2 are executed step by step by means of the whole of the coils 27, 28 and 29 energized in succession.

Figure 2A:
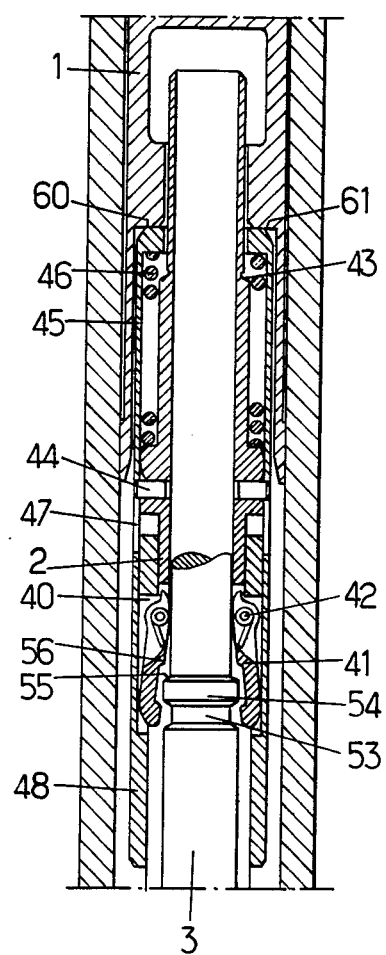
FIG. 2a is a view on a larger scale of part of FIG. 2 showing particularly the pivoting fingers and their actuating mechanism.
Figure 2A:
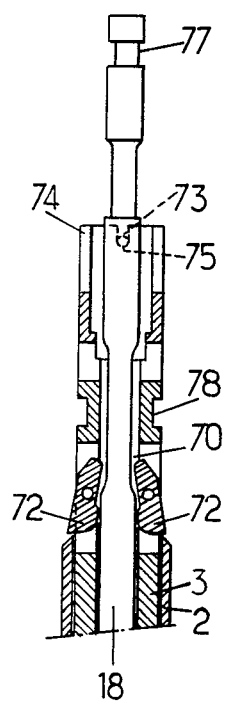

As may be seen in FIGS. 2 and 2a, the actuating rod 2 carries in its upper part, within notches 40, pivoting fingers 41 fitted on horizontal axes 42. By pivoting, the end of the fingers 41 can project more or less within the internal space of the actuating rod 2. Only two pivoting fingers 41 have been shown in FIGS. 2 and 2a, but there are four fingers 41 arranged in notches at 90° within the envelope of the cylindrical sleeve forming the actuating rod 2.

Above the fingers 41, the actuating rod 2 carries studs 44 projecting slightly outwards. An operating sleeve 45 forming the actuating device of the fingers 41 is fitted slidingly on the upper end of the actuating rod 2, a spring 46 being interposed between the upper part of the sleeve 45 and a part of the actuating rod 2 so as to maintain this sleeve 45 in the top position relative to the actuating rod 2. The studs 44 are engaged in ports 47 of the wall of the sleeve 45 so as to lock the operating sleeve 45 in rotation on the actuating rod 2. The studs 44 likewise form two stops limiting the upward movement of the operating sleeve 45 relative to the rod 2 as shown in FIG. 2a where the sleeve 45 has been shown in its bottom position. The downward limitation of the stroke of the operating sleeve 45 is effected by means of the stop 43 made at the upper part of the actuating rod 2. The sleeve 45 comprises at its lower part an actuating cam 48 for the fingers 41 formed by an annular increase in thickness on the internal surface of this sleeve 45. In the bottom position of the sleeve 45 shown in FIG. 2a, the cam 48 does not act upon the pivoting fingers 41, which are then maintained in the open position by springs associated with the axes 42. On the contrary, when the sleeve 45 is maintained in the top position by the spring 46, as shown in FIG. 2, the cam 48 acts upon the fingers 41 to maintain them in the closed position where they project considerably inside the internal space of the actuating rod 2.

FIGS. 1 and 2 show that the actuating rod 3 is fitted coaxially to the actuating rod 2 throughout its length and within the latter. An annular passage of variable diameter which is reserved between the actuating rods 2 and 3 is filled with pressurized fluid when the reactor is in operation, the internal volume of the fluid-tight enclosure 1 then being in communication with the internal volume of the vessel filled with pressurized fluid. This annular passage is continuous for its entire circumference over a part of the length of the rods and formed by discontinuous sectors at the level of the guidances 2a–3a of the rod 3 in the internal space of the rod 2.

The central rod 3 also comprises a widened part 3b on which two sealing segments 50 are arranged, nevertheless permitting a limited passage of pressurized cooling fluid in the annular passage between the actuating rods 2 and 3. The segments 50 likewise permit the axial guidance of the actuating rod 3 within the actuating rod 2, the part 3b of the actuating rod 3 forming a movable piston within the bore of the rod 2.

On the other hand, the central actuating rod 3 comprises a flute 53 in its upper part limited by a projecting part 54 comprising an upper shoulder 55. FIG. 2a likewise shows that the upper shoulder 55, in the top position of the rod 3 illustrated in FIGS. 2 and 2a, comes into abutment with a bearing surface 56 made on the internal surface of the actuating rod 2. In this position of the internal actuating rod 3, the groove 53 is located opposite the hooking end of the fingers 41.

The operating sleeve 45 also comprises an upper shoulder 60 coming into contact with a bearing surface 61 made on the fluid-tight chamber 1, which permits the operating sleeve 45 to be returned into the bottom position, as shown in FIG. 2a, counter to the action of the spring, at the end of the upward movement of the rod 2 carrying the sleeve 45. In this position the fingers 41 are separated as shown in FIG. 2a.

The upper part of the chamber 1 is also connected to a pipe 64 in which a pressure relief valve 65 is placed. The opening of this pressure relief valve permits a very rapid reduction of the pressure in the upper part of the chamber 1, particularly in that part of the annular space included between the actuating rods 2 and 3 located above the sealing segments 50. The lower face of the piston 3b is then subject to the thrust due to the difference in pressure of the fluid on either side of the segments 50. This results in an upward movement of the actuating rod 3 until the moment when it comes into abutment by its shoulder 55 against the bearing surface 56.

The rod 18 comprises at its upper part, as shown in FIGS. 2 and 2b, a part of smaller diameter 70 terminated by frustoconical ramps permitting the operation of the pivoting cams 72 carried by the actuating rod 3, the bearing surfaces of which against the handling rod 18 are such that the cams 72 project slightly outwards when the rod 18 is in the top position as shown in FIG. 2b, and in the retracted position when the rod is in its bottom position as shown in FIG. 2. When the rod 18 is in the bottom position, that is to say in the locking position of the actuating rod 3 in the cluster knob 23, the projecting internal parts of the cams 72 are located at the level of the smaller diameter part 70 of the handling rod 18, which permits the return into the retracted position where their ends do not project outside the actuating rod 3.

The actuating rod 3 comprises at its upper part two short slots 73 and two long slots 74 in its lateral wall, these slots leading to the upper part of the actuating rod 3. The slots 73 and 74 are arranged at 90° and the handling rod 18 comprises two studs 75 which can be engaged either in the slots 73 or in the slots 74. The springs driving the handling rod 18 downwards therefore cause this rod 18 to come into abutment either at the bottom of the slots 73 or at the bottom of the slots 74, through the intermediary of the studs 75, according to the orientation of the handling rod 18 relative to the actuating rod 3.

The rod 18 comprises at its upper end a flute 77 for the engagement of the gripping element of an operating tool for the handling rod which can be attached to the actuating rod in the stowage groove 78 made on the external surface of the latter.

The operation of the device during the various maneuvers necessary during the operation of the reactor between two recharges will now be described.

When the recharge of the reactor has just been executed, the clusters are in the inserted position in the corresponding fuel arrays, and it is necessary to perform the recoupling of the actuating rods with the clusters of control rods. The actuating rods are arranged in the cluster guides of the upper internal equipments of the reactor which have just been placed above the core, within the reactor vessel.

The coupling bushings 5 and 20 of the two actuating rods are in the unlocked position, the locking sleeve 12 being oriented as shown in FIG. 1a and the handling rod 18 being in the top position maintained through the intermediary of the studs 75 in the short slots 73.

The recoupling of the actuating rods 2 of the control clusters of the reactor is executed first. To do this, a tool suspended from the winch of the charging crane of the reactor is used, which is brought up to the upper part of the actuating rod 2 in the cluster guide of the upper internal equipments. The tool comprises a long telescopic tube which permits the actuating rod to be lowered into position above the cluster knob 7 on which the bushing 5 couples at the end of stroke by the effect of the weight of the actuating rod and of the tool. The coupling is effected by a slight lateral deformation of the flexible blades 5a and 5b until the projecting parts of the blades become lodged in the grooves of the cluster knob 7.

The lower part of the telescopic tube comprises a J-shaped slot which can be engaged on the studs 17 to produce a bayonet joint between the telescopic tube of the tool and the locking sleeve 12. By rotating and translating the tool, the sleeve 12 can be moved so as to transfer the studs 10 from one member to the other of the U-shaped port 14. The locking of the flexible blades 5a and 5b is thus effected by placing the solid part of the locking sleeve 12 opposite these blades. The telescopic tube is then maneuvered so as to disengage the studs 17 from the J-shaped slots of this tool. The tool is retracted and the locking of the coupling bushing is checked by checking by means of a weighing machine that the actuating rod and its cluster are in fact entrained simultaneously when the tool is raised.

The operation is repeated for each of the arrays forming a control cluster.

The recoupling of the actuating rods 3 with the knobs 23 of the spectrum variation clusters is then effected. To do this, a second tool suspended from the winch of the charging crane of the reactor is used, which is brought over the upper part of the actuating rod 3 using the approach groove 78. The actuating rods 3 are in fact engaged within the actuating rods 2, and it is only necessary to use the tool to lower the actuating rod 3 until the bushing 20 becomes engaged in the knob 23 of the spectrum variation cluster. The locking of the bushing 20 is then effected by means of the handling rod 18, which is raised by the tool and then turned one quarter of a turn to engage the studs 75 in the long slots 74. The rod then descends again by the effect of the springs, so that the oval knob 19 assumes the separating position of the expansible bushing 20 as shown in FIG. 1.

The operation is performed for each of the arrays comprising a control cluster and a spectrum variation cluster simultaneously.

After each operation the correct locking of the bushings is checked by raising the tool and by checking with a weighing machine that the assembly of the two actuating rods and of the two clusters is then actually raised.

When the assembly of the two actuating rods has been recoupled, the vessel cover is replaced, to which the fluid-tight enclosures 1 are fixed, carrying the movement mechanism of the actuating rod 2 before the starting up operations of the reactor.

During the first part of the operating cycle of the reactor, the spectrum variation clusters consisting of fertile rods are left in the position of maximum insertion in the arrays, whereas the control clusters are used for the operation of the reactor. In fact, the actuating rod 2 and the actuating rod 3 are entirely independent and the movements of the actuating rod 2 involve no movement of the actuating rod 3 and of the spectrum variation cluster. On the other hand, it has been discovered that the descent times of the control rods responsible for running the reactor are identical to the times recorded with reactors not having spectrum variation clusters, in spite of the presence of the actuating rod 3 prolonging these spectrum variation clusters.

At the end of the first part of the operating cycle of the reactor (the duration of which is approximately equal to four-fifths of the service run of the reactor), the spectrum variation clusters must be extracted progressively, and to do this one starts with those which are associated with actuating rods which are already in the top position to avoid disturbing the running of the reactor. Beyond this top position there is a slight overstroke of the actuating rod 2, which enables the bearing surface 60 of the sleeve 45 to be brought into abutment with the shoulder 61 of the fluid-tight enclosure 1. The overstroke permits a relative movement of the sleeve 45 and of the rod 2, the spring 46 then being compressed, so as to disengage the fingers of the cam 48. The fingers 41 are then in the open position. The pressure relief valve 65 is then opened, which has the effect of creating very rapidly a negative pressure of the order of 22 bars in the upper part of the fluid-tight enclosure 1 and in the annular space between the actuating rods 2 and 3 above the segments 50. The actuating rod 3 is then driven upwards within the actuating rod 2, entraining the spectrum variation cluster which is extracted from the array during its upward movement.

The upward movement of the actuating rod 3 continues until the shoulder 55 comes into abutment with the bearing surface 56. The flute 53 is then in position opposite the hooking ends of the fingers 41. The actuating rod 2 is then lowered again by two or three steps, using the electromagnetic controlled movement mechanism of this actuating rod. This has the effect of returning the fingers opposite the closure cam 48, which recloses these fingers in the flute 53. The two actuating rods 2 and 3 are then firmly fixed together.

The movements of the actuating rod 2 therefore entrain both the cluster of control rods and the cluster of spectrum variation rods. The mass moved by the pawl mechanism is therefore greater than in the actual operation of a pressurized water nuclear reactor, which might lead to more rapid wear of the pawls. However, during this part of the operating cycle representing one-fifth of the total cycle duration, the nuclear reactor operates as a basic station and cluster movements are very limited, so that the increase in wear of the pawls remains slight.

In the case of emergency shut-down, the electrical supply to the coils is switched off, which opens the pawls 30 and 34. The assembly of the two clusters therefore drops into the position of maximum insertion by the effect of its weight.

At the end of the operating cycle of the reactor, the unhooking of the actuating rods 3 of the clusters of fertile rods is effected first. To do this, the actuating rod 2 is once again brought to its upper overstroke, which has the effect of causing the fingers 41 to open by downward movement of the finger operating sleeve 45.

The actuating rods 3 then fall with their clusters into the position of maximum insertion. This fall is very slow, because the pressurized fluid displaced during the fall of the actuating rod 3 is forced into the very small space made between the upper part of the actuating rod 2 and the bore of the fluid tight enclosure 1 located above the bearing surface 61, as may be seen in FIG. 2a.

The operations on the control rods of the reactor are then identical to what they were for the pressurized water reactors of conventional type, before a recharge.

After the pressure in the reactor vessel has been relieved and its cover removed, the unlocking and decoupling of the actuating rods is performed, using the same tools required for the coupling and the locking of these actuating rods to the corresponding clusters.

When the handling rod 18 is brought into the unlocking position, the studs 75 being introduced into the short slots 73, the ends of the cams 72 are in a slightly projecting position relative to the external surface of the actuating rod 3. When all the actuating rods have been unlocked and the lifting of the upper internal equipments entraining the actuating rods 2 resting in these internal equipments is performed, the actuating rods 3 which rest through the intermediary of the cams 72 upon the upper end of the actuating rods 2, are entrained simultaneously.

It is therefore clear that the device according to the invention permits the solution of all problems relating to the insertion and the extraction of the control clusters and of the spectrum variation clusters, and also to the mounting and dismantling of the actuating rods of these clusters without necessitating additional motor drive devices to those which are used in pressurized water nuclear reactors of conventional type.

Particularly, the use of an additional electromagnetic maintaining coil for the hooking in the top position of the actuating rod of the spectrum variation cluster during the last part of the operating cycle of the reactor is avoided. The use of any type of additional motor drive means for the extraction of the spectrum variation clusters is likewise avoided.

The invention is not limited to the embodiment which has just been described; on the contrary it embraces all variants thereof.

Thus, instead of a movement mechanism with pawls and electromagnetic coils, any other type of mechanism, such as a screw and nut or a magnetic coupling mechanism, may be used for the movement of the actuating rod of the control cluster.

Other modes of attachment of the lower ends of the actuating rods to the knob of the clusters, or other principles of actuation of the fingers 41 mounted on the upper part of the actuating rod 2, may likewise be imagined.

Lastly, the actuating device according to the invention is applicable not only to pressurized water nuclear reactors with improved efficiency employing a spectrum variation cluster in addition to the control clusters, but also to any reactor employing clusters fully inserted during a part of the operating cycle of the reactor in addition to control clusters with controlled movement.

We claim:

1. An actuating device for two clusters of control rods movable vertically in one and the same fuel array in the core of a nuclear reactor comprising a vessel containing a pressurized fluid in which is immersed the reactor core consisting of arrays formed by vertically arranged bundles of fuel rods into which the clusters are inserted during the operation of the reactor, one of these clusters comprising neutron-absorbing rods effecting the running of the reactor by the vertical movements modifying the insertion of the absorbing rods, and the second cluster remaining fully inserted into the array during only a part of the operating cycle of the reactor, independently of the movements of the first cluster, each of the clusters consisting of an assembly of rods arranged mutually parallel and attached to a fixing piece, the mechanism comprising two long vertical actuating rods (2, 3), the one associated with the first and the other with the second of the two clusters, movable within a fluid-tight enclosure (1) communicating with the internal volume of the vessel, a maintenance and controlled vertical movement mechanisms (27, 28, 29, 30, 34) in the fluid-tight enclosure of the actuating rod (2) of the first cluster and a detachable connecting device between each of the two clusters and the corresponding actuating rod (2, 3), wherein:

the actuating rod (2) of the first cluster, or first actuating rod, consists of a cylindrical sleeve carrying in its upper part hooking fingers (41) movable transversely to project into the internal space of the actuating rod (2) or on the contrary into the retracted position and an actuating device (45) of these fingers fitted slidingly in the axial direction on the top end of the actuating rod (2) between a closed position of the fingers (41) where the actuating device (45) is maintained in the top position relative to the actuating rod (2) by a spring (46) and an open position of the fingers (41) where it is moved into the bottom position by virtue of a bearing surface (60) coming into abutment on a part (61) of the internal surface of the fluid-tight enclosure (1) at the end of the upward movement of the first actuating rod (2), the actuating rod (3) of the second cluster, or second actuating rod, arranged coaxially and within the first actuating rod (2) throughout its length comprises a widened part ($3_b$) fitted with sealing segments (50) limiting the passage of the pressurized fluid in the annular space made between the two actuating rods (2, 3) and effecting the guidance of the second actuating rod (3) consisting of a piston in the first actuating rod (2), a hooking groove (53) for the fingers (41) carried by the first actuating rod (2) and a projecting part (55) serving as an abutment to stop the second actuating rod in the hooked position of the fingers at the end of the upward movement of the second rod (3) in the first (2), lastly, the fluid-tight enclosure (1) comprises at its upper part a pressure relief valve (65) for its internal volume.

2. An actuating device as claimed in claim 1, wherein the first actuating rod (2) carries at its lower end a laterally expansible bushing (5) exhibiting on its internal surface hooking projections (6) intended to cooperate with grooves (7) machined on the external surface of the fixing piece of the first cluster and a locking sleeve (12) of the bushing (5) in the hooking position of the cluster fitted on the end of the actuating rod (2) about the bushing (5) and movable in rotation and in axial translation, the actuating rod (3) of the second cluster being equipped with a cluster hooking device known per se comprising an expansible bushing (20) equipped with external projections (21) intended to be introduced into a corresponding orifice of the fixing piece of the cluster and a central rod (3) equipped with an oval knob (19) at its end for the locking of the bushing (20).

3. An actuating device as claimed in claim 2, wherein the locking sleeve (12) of the expansible bushing (5) attached to the first actuating rod (2) comprises two ports (13) for the passage of flexible blades ($5_a$, $5_b$) forming the expansible bushing (5) in their open position and two U-shaped ports (14) for the engagement of locking fingers (10) attached to the first actuating rod (2), the locking sleeve (12) being repelled downwards by a spring (15) interposed between the actuating rod (2) and the locking sleeve (12).

4. The application of an actuating device as claimed in any of claims 1, 2 and 3 to the case of a nuclear reactor with improved efficiency, a part of the arrays of which is equipped with a control cluster and with a spectrum variation cluster simultaneously.

* * * * *